United States Patent
Lee et al.

(10) Patent No.: US 9,467,517 B2
(45) Date of Patent: Oct. 11, 2016

(54) METHOD AND APPARATUS FOR REMOTE MANAGEMENT OF DEVICE

(75) Inventors: Ji-Hye Lee, Gyeonggi-do (KR); Sung-Jin Park, Gyeonggi-do (KR); Sung-Oh Hwang, Gyeonggi-do (KR); Wuk Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 12/858,047

(22) Filed: Aug. 17, 2010

(65) Prior Publication Data

US 2011/0040829 A1 Feb. 17, 2011

(30) Foreign Application Priority Data

Aug. 17, 2009 (KR) .................. 10-2009-0075922
Nov. 19, 2009 (KR) .................. 10-2009-0112281

(51) Int. Cl.
  *G06F 15/16* (2006.01)
  *H04L 29/08* (2006.01)
  *H04L 12/24* (2006.01)

(52) U.S. Cl.
  CPC ............ *H04L 67/125* (2013.01); *H04L 67/10* (2013.01); *H04L 41/20* (2013.01)

(58) Field of Classification Search
  CPC  H04L 41/0803; H04L 41/0886; H04L 41/12
  USPC ........................................................ 709/203
  See application file for complete search history.

(56) References Cited

U.S. PATENT DOCUMENTS 7,991,878 B2    8/2011  Li et al.
8,838,754 B1 *  9/2014  Rao ............................. 709/221
(Continued)

FOREIGN PATENT DOCUMENTS

CN  1859194    11/2006
CN  101114933  1/2008
(Continued)

OTHER PUBLICATIONS

OMA, Firmware Update Management Object Architecture, Open Mobile Alliance, OMA-AD-FUMO-V1_0-20070118-C, Candidate Version 1.0, Jan. 18, 2007.

(Continued)

*Primary Examiner* — Hua Fan
(74) *Attorney, Agent, or Firm* — The Farrell Law Firm, P.C.

(57) ABSTRACT

Disclosed is remote management of a device by using another device that supports device management service as an intermediary. The device collects device information of said at least one device connected through a personal area network, converts the device information to converted device information of a form based on a device management protocol supported by the device management server, transfers the converted device information to the device management server, receives function management data related to said at least one device from the device management server, and transfers the received function management data to said at least one device through the personal area network.

18 Claims, 8 Drawing Sheets

(56) References Cited

U.S. PATENT DOCUMENTS

| | | | |
|---|---|---|---|
| 2002/0129170 A1* | 9/2002 | Moore et al. | 709/249 |
| 2003/0101240 A1* | 5/2003 | Courtney | 709/220 |
| 2003/0177270 A1 | 9/2003 | Noda et al. | |
| 2003/0204640 A1 | 10/2003 | Sahinoja et al. | |
| 2005/0228847 A1 | 10/2005 | Hayes | |
| 2006/0004742 A1* | 1/2006 | Datla et al. | 707/4 |
| 2006/0013217 A1* | 1/2006 | Datla et al. | 370/389 |
| 2006/0015591 A1* | 1/2006 | Datla et al. | 709/220 |
| 2008/0114570 A1 | 5/2008 | Li et al. | |
| 2008/0244049 A1 | 10/2008 | Normark et al. | |
| 2009/0062410 A1 | 3/2009 | Maurer et al. | |
| 2010/0216449 A1* | 8/2010 | Luo et al. | 455/418 |
| 2013/0078984 A1 | 3/2013 | Luo et al. | |

FOREIGN PATENT DOCUMENTS

| | | | |
|---|---|---|---|
| CN | 101437071 | | 5/2009 |
| CN | WO/2009/062410 | * | 5/2009 |
| JP | 2003-046535 | | 2/2003 |
| JP | 2009-545039 | | 12/2009 |
| KR | 1020020079006 | | 10/2002 |
| KR | 1020060016649 | | 2/2006 |
| KR | 1020060066385 | | 6/2006 |
| KR | 1020070113823 | | 11/2007 |
| KR | 1020090063504 | | 6/2009 |
| RU | 2 337 489 | | 10/2008 |
| WO | WO 2008/014647 | | 2/2008 |

OTHER PUBLICATIONS

Delphinanto et al., "Remote Discovery and Management of End-User Devices in Heterogeneous Private Networks", Consumer Communications and Networking Conference, Jan. 10, 2009.

REQ CPNS AHG, "CPNS and DM: Introduction to the Device Management Group", Open Mobile Alliance, Feb. 10, 2009.

Ericsson, LG, "Merged CPNS Functional Architecture Proposal", Open Mobile Alliance, Apr. 14, 2009.

Samsung Electronics, "Another Perspective on CDM", Open Mobile Alliance, Dec. 11, 2008.

Mark Staskauskas et al., "Changes to CPNS RD Introduction Section", Open Mobile Alliance, Jun. 19, 2009.

Russian Office Action dated Oct. 10, 2014 issued in counterpart application No. 2012110220/08.

OMA, OMA Device Management Protocol, Open Mobile Alliance, Approved Version 1.2.1 OMA-TS-DM_Protocol-V1_2_1-20080617-A, Jun. 17, 2008.

OMA, DM List of Suppported Management Object (ListMO), Open Mobile Alliance, OMA-ER-ListMO-V1_0-20110110-0, Draft Version 1.0, Jan. 10, 2011.

Japanese Office Action dated Mar. 25, 2014 Issued in a counterpart application No. 2012-525476.

Korean Office Action dated Jan. 21, 2016 issued in counterpart application No. 10-2009-0112281, 10 pages.

* cited by examiner

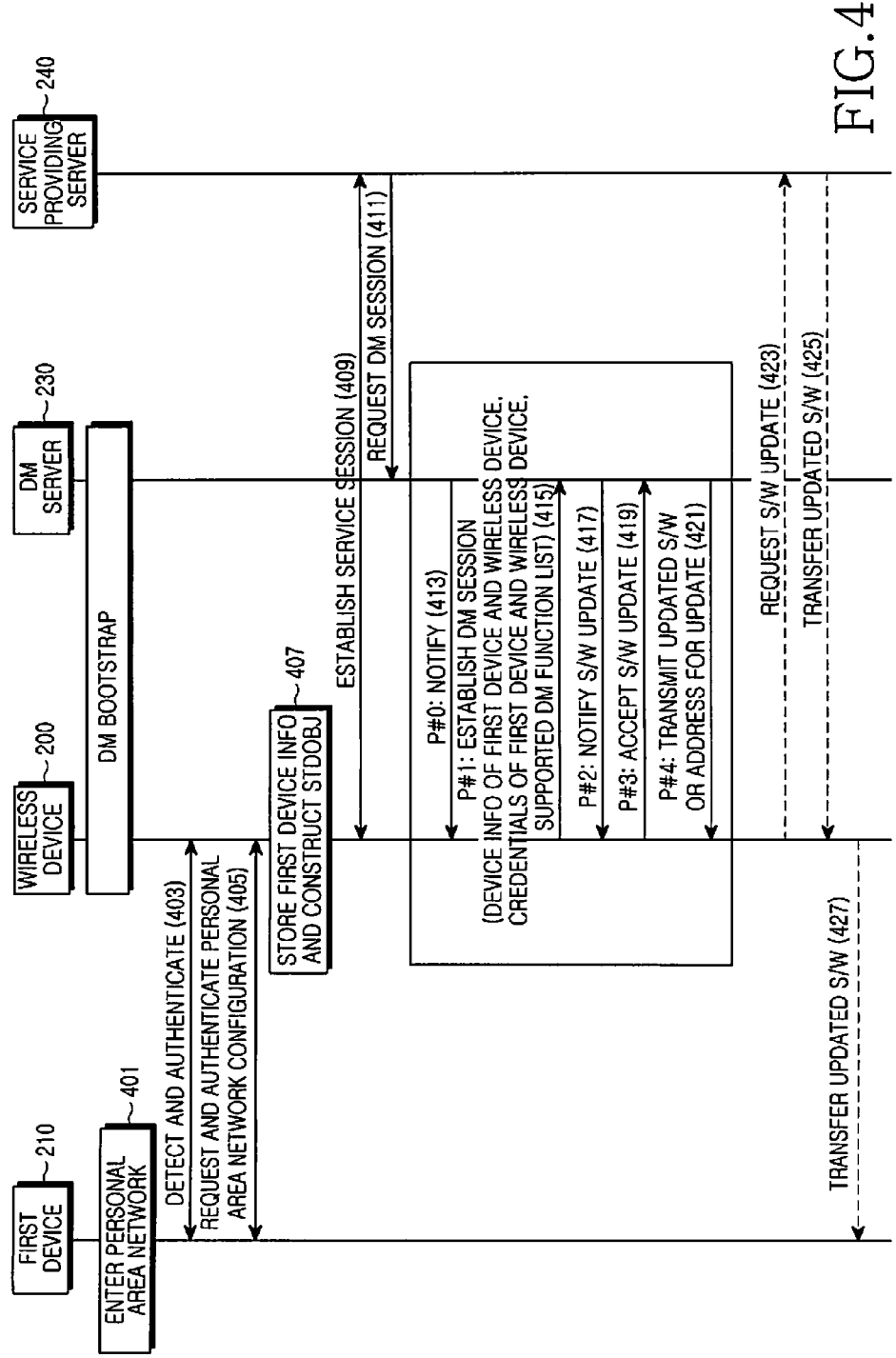

METHOD AND APPARATUS FOR REMOTE MANAGEMENT OF DEVICE

PRIORITY

This application claims priority under 35 U.S.C. §119(a) to applications filed with the Korean Intellectual Property Office on Aug. 17, 2009 and Nov. 19, 2009 and assigned Serial Nos. 10-2009-0075922 and 10-2009-0112281, respectively, the contents of both of which are incorporated herein by reference.

BACKGROUND OF THE INVENTION

1. Field of the Invention

The present invention relates generally to remote management of a device, and more particularly to a method and apparatus for remotely managing a device by using another device as an intermediary.

2. Description of the Related Art

As the number of wireless communication devices proliferates over time, a standard method for managing wireless communication devices has become necessary. In this respect, the mobile device management method has been developed for managing firmware, software, parameters, schedules, and HardWare (H/W) capabilities while a wireless communication business operator or a service provider wirelessly communicates with the devices.

The representative remote management method is the OMA (Open Mobile Alliance) DM (Device Management) developed in the organization of the OMA, which establishes an application standard for wireless communication devices. The OMA DM reads, adds, deletes, modifies, and executes an object of the wireless communication device using the DM protocol based on SyncML (Synchronization Markup Language), so that it is possible to manage internal firmware, software, and other parameters of the device. The subject of managing a device, such as a wireless communication device, corresponds to a DM server and a device subject to the management, such as the wireless communication device, corresponds to a client. Therefore, the device subject to the management includes the DM client.

The conventional device management is performed in a peer-to-peer scheme. That is, a peer-to-peer session is established between the DM server in the network and the DM client included in the wireless communication device to transmit/receive a message defined in the DM protocol, so that the DM server may allow the DM client to add/delete/modify a specific configuration in the device or perform the specific operation.

The DM protocol is defined as a total of 5 messages from package #0 through package #4 and the DM session can be established between the DM server and the device through the DM protocol. The DM session can be initiated by the DM server or the DM client, i.e. the device.

FIG. 1 illustrates a general process of establishing the DM session.

Referring to FIG. 1, if a DM server 20 has a management operation to be performed for a device, the DM server 20 transfers a package #0 notification message to the device, i.e. a DM client 10 included in the device, and notifies the DM client 10 of the existence of a DM operation in step 101. When the DM client 10 receives the package #0 notification message, the DM client 10 transmits a package #1 message to the DM server 20 and requests the DM client 10 to establish a session in step 103. If the DM client 10 does not receive the package #0 notification message, the DM client 10 can make a request for the DM session to the DM server 20 according to necessity or periodically, and update a function of the device.

The DM server 20 allows the establishment of the DM session and transmits a package #2 message that transfers a DM command for the standby device management operation to the DM client 10 in step 105. The DM client 10 responds to the package #2 message and transmits a package #3 message to the DM server 20 so as to transfer a performance result of the DM commend received from the DM server 20 in step 107.

Subsequently, the DM server 20 terminates the DM session or transfers an additional management operation to the DM client 10 through a package #4 message in step 109 and the DM client 10 performs the additional management operation included in the package #4 message and reports the result to the DM server 20 through a package #3 message in step 111.

Thereafter, the DM server 20 and the DM client 10 can provide the management operation or the management commands through the repetitive transmission of the package #4 message and the package #3 message. In this case, if a management operation is continuously included in the package #4 message, the DM session is maintained. However, if there is no additional management operation in the package #4 message, the DM session is terminated.

However, in the afore-mentioned DM system, the wireless device having a DM network access function is the principal subject to the remote management, so that only the direct device management between the DM server and the device including the DM client can be implemented. That is, it is not possible to remotely manage the device having no function of accessing the DM network or an external network or having no DM client.

Further, such a device cannot receive the services provided from a service providing server connected to the external network, because the corresponding devices do not have the necessary software for reproducing contents provided from the service providing server, and are not able to access the external network. Here, the service providing server refers to a server providing various such services as multimedia contents, games and advertisements.

Therefore, a need exists in the art for a method by which the device having no function of accessing the external network or having no DM client can be remotely managed without additionally including the DM client.

SUMMARY OF THE INVENTION

Accordingly, the present invention has been made to solve the above-stated problems occurring in the prior art, and the present invention provides a method and apparatus capable of remotely managing a device having no function of accessing the external network or having no DM network.

Further, the present invention provides a method and apparatus capable of remotely managing a device that does not support a DM protocol.

In addition, the present invention provides a method and apparatus allowing a device that does not support the DM protocol to support various services provided from a service providing server included in an external network.

In accordance with an aspect of the present invention, there is provided a method for remotely managing at least one device by a management device supporting a device management service provided from a device management server, the method including collecting device information of said at least one device connected through a personal area network, converting partial information necessary for discriminating said at least one device among the device information to converted device information of a form based on a device management protocol supported by the device management server, transferring the converted device information to the device management server, receiving function management data related to said at least one device from the device management server, and transferring the received function management data to said at least one device through the personal area network.

BRIEF DESCRIPTION OF THE DRAWINGS

The above and other aspects, features and advantages of the present invention will be more apparent from the following detailed description taken in conjunction with the accompanying drawings, in which:

FIG. 4 illustrates a device management process according to a second embodiment of the present invention;

DETAILED DESCRIPTION OF EMBODIMENTS OF THE PRESENT INVENTION

Figure 1:
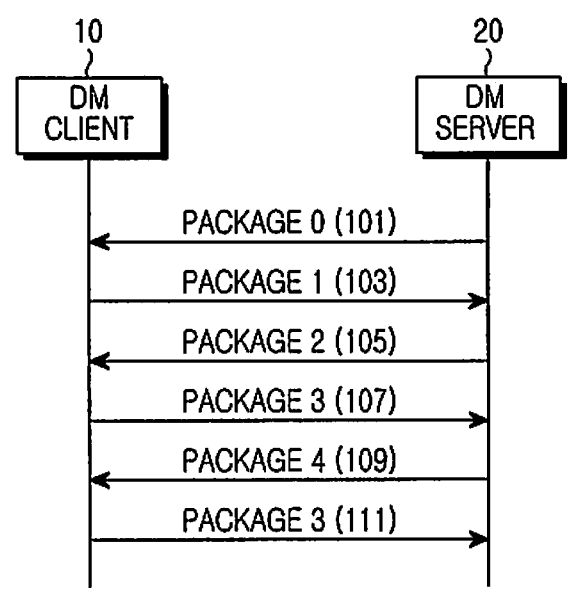
FIG. 1 illustrates a conventional device management process.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

As the types and number of portable devices carried by a user, such as an MP3 (MPEG Layer 3) player, a PMP (Portable Multimedia Player), a PDA (Personal Digital Assistant), and a cellular phone have increased and functions of the portable device have been diversified, in order to share contents between the devices possessed by the user, it has been possible to form a network between each portable device. Such a network refers to a personal area network.

The personal area network can be formed, for example, by Bluetooth®, Wi-Fi (Wireless-Fidelity), or infrared communication. Recently, the personal area network based on UPnP (Universal Plug & Play) has been commonly used. Every device supporting a communication scheme of a corresponding personal area network can participate in the personal area network.

In the present invention, in order to remotely manage various firmware, software, parameters, schedules, and H/W capabilities, of a device that can form the personal area network but cannot be connected to an external network, or does not include a DM client, a device including the DM client is used as a gateway device or a proxy device.

That is, where the device including the DM client forms the personal area network between other devices, according to the present invention, the device including the DM client is set as the gateway device so that it is possible to remotely manage other devices through the device including the DM client.

Figure 2:
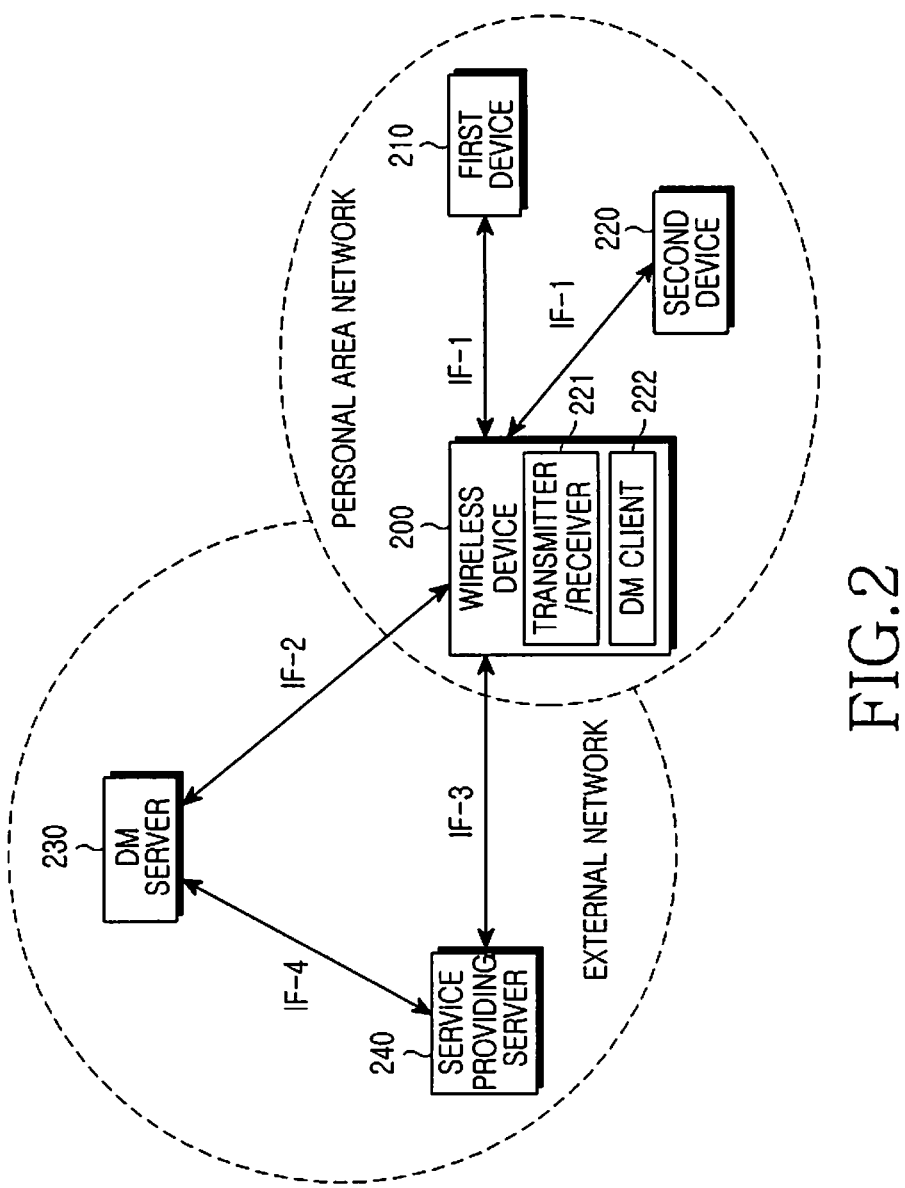
FIG. 2 illustrates the configuration of a device management system according to an embodiment of the present invention.

FIG. 2 illustrates an example of a device management system according to an embodiment of the present invention. Referring to FIG. 2, the DM system has various multiple personal devices including a wireless device 200 forming the personal area network, a first device 210, a second device 220, a DM server 230, and a service providing server 240.

The DM server 230 is located in an external network. The DM server 230 reads, adds, deletes, modifies, and executes an object of a device subject to the management using a DM protocol so that it is possible to manage internal firmware, software, parameters, schedules, and hardware capabilities of the device. Although not shown in FIG. 2, the DM server 230 includes a control unit for controlling an operation necessary for the above management function, and a transmitter/receiver for transmitting/receiving a message with the device subject to the management. The operation of the DM server 230, which will be described hereinafter, is performed under the control of the control unit.

The service providing server 240 provides to the device various services, such as game contents, multimedia contents, and advertisement contents. Further, the service providing server 240 can provide various programs, firmware, and software required for the reproduction of corresponding contents, as well as various contents and data.

The first device 210 and the second device 220 can be connected to the personal area network, but are not able to be connected to the external network, do not include the DM client, or include a DM client supporting a DM protocol other than the DM protocol that is supported by the DM server 230. Therefore, in the present invention, the first device 210 and the second device 220 are capable of receiving the device management from the DM server 230 through the wireless device 200. For example, the first device 210 and the second device 220 may be an MP3 player, a PMP, or a television.

Although not shown, the first device 210 and the second device 220 include a communication module and a control unit. The communication module supports the connection of the first device and the second device with the personal area network, and the control unit controls the communication module so as to participate in the personal area network and the transmission/receipt of data or messages with the wireless device 200 through the communication module, so that the operation of the device enables the remote management of the device according to the present invention. The first device 210 and the second device 220 include memory for storing device information and data obtained by a result of the remote management, respectively.

The wireless device 200 is capable of connecting to an external network, as well as the personal area network, and includes the DM client that is compatible with the DM server 230. Further, the wireless device 200 according to the present invention is set as the gateway device or the proxy device, so that it corresponds to a management device performing a role of an intermediary for the device management between the DM server 230 of the external network and the first and second devices 210 and 220. Further, the wireless device 200 can communicate with the service providing server 240 and make a request for or receive various contents and data provided from the service providing server 240. The wireless device 200 can make a request for necessary contents to the service providing server 240, instead of the first device 210 and the second device 220. In this respect, the wireless device 200 can provide the first device 210 and the second device 220 with the various contents and data received from the service providing server 240. For example, the wireless device 200 is a mobile communication device, a portable computer, or a PDA.

The wireless device 200 includes the DM client 222, the transmitter/receiver 221 for forming the personal area network with the first device 210 and the second device 220 to transmit and receive data, and memory for storing various data used during the operation of the device management according to the present invention. The control of the operation of the device management and the transmission/receipt of the data or message between the DM server 230 is performed by the DM client 222. The DM client 222 can communicate with the service providing server 240. In another embodiment of the present invention, a communication unit for transmitting/receiving data with the DM server 230 and the service providing server can be included in addition to the DM client.

The process of the remote management of the first device 210 and the second device 220 in the DM system according to the embodiment of the present invention will be described with reference to FIGS. 3 through 5D. In the following embodiment, the process of the management of the first device 210 will be described in order to assist in providing a general understanding of the present invention, but it is apparent that this is similarly applied to the second device 220.

Figure 3:
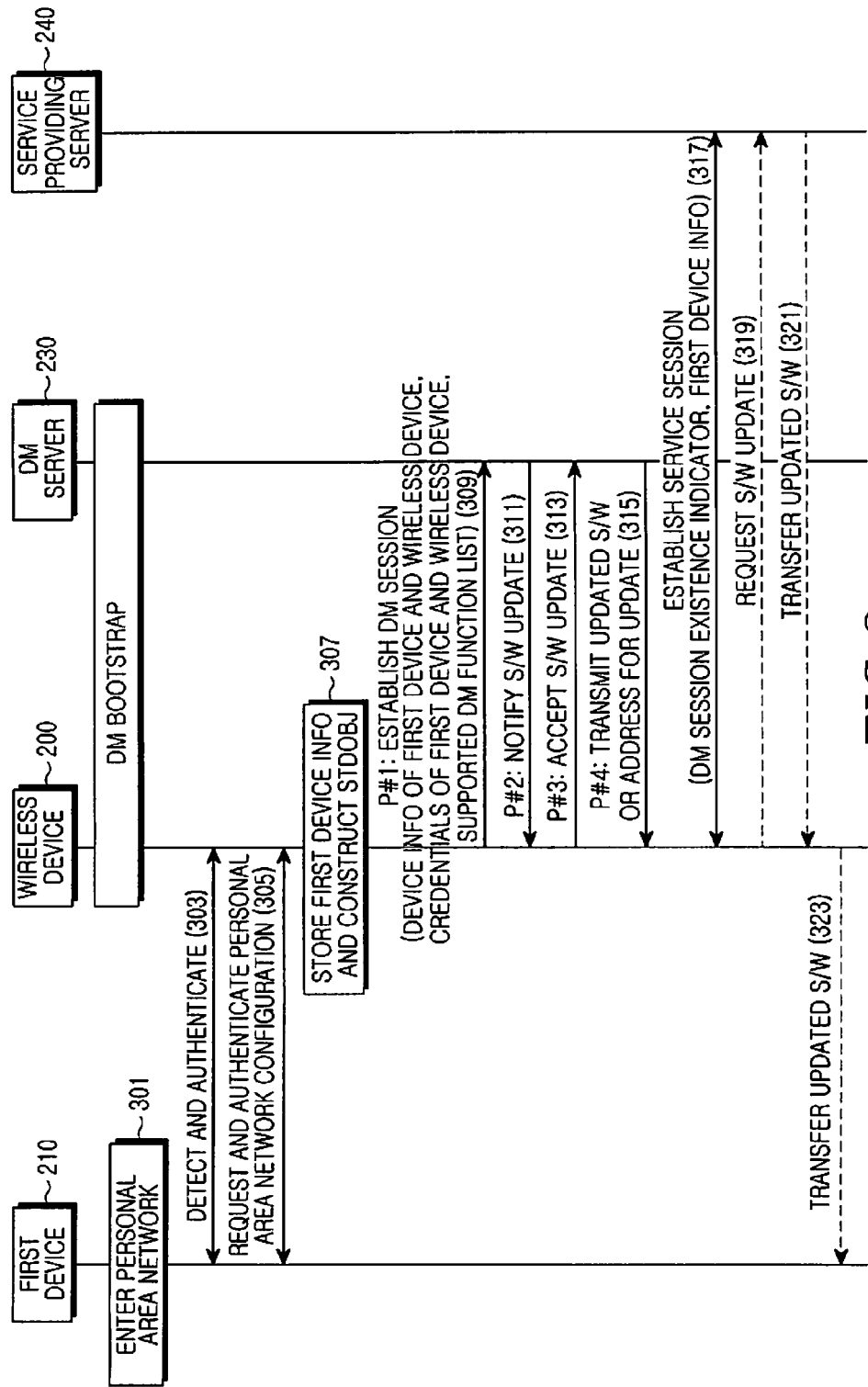
FIG. 3 illustrates a device management process according to a first embodiment of the present invention.

FIG. 3 illustrates a device management process according to a first embodiment of the present invention, in which the wireless device 200 triggers the establishment of a DM session in place of the first device 210 and provides the first device 210 with a predetermined service. It is assumed that the wireless device 200 has been DM-bootstrapped to the DM server 230 and is in a state in which the wireless device 200 has been completely prepared to connect the DM session.

Referring to FIG. 3, when the first device 210 accesses the personal area network in step 301, the wireless device 200 functioning as the gateway or proxy of the corresponding personal area network detects and authenticates the first device 210 in step 303. Such a process of detection and authentication can use the protocol of the prior art, such as UPnP, enabling the devices to access the personal area network.

When the wireless device 200 detects and authenticates the existence of the first device 210 in step 303, the first device 210 makes a request for the configuration of the personal area network to the wireless device 200, which authenticates the configuration of the personal area network of the first device 210 in step 305.

When the first device 210 has been connected to the personal area network based on the wireless device 200, the wireless device 200 can make a request for the establishment of a service session to the service providing server 240, instead of the first device 210. Therefore, in order for the first device 210 to receive a service and to make a condition in which the service providing server 240 can provide the first device 210 with the service, the wireless device 200 checks and manages the internal configuration of the first device 210 using the DM protocol.

To this end, according to the first embodiment of the present invention, the first device 210 transfers device information of the first device 210 to the wireless device 200 together with the request for the configuration of the personal area network in step 305. Alternatively, the wireless device 200 forms the personal area network with the first device 210 and then requests the device information of the first device 210, which provides the wireless device 200 with the device information of the first device 210 in response to the request.

The device information includes detail information on such information as various firmware, software, parameters, schedules, and H/W capabilities presently installed in the first device 210, as well as basic information, such as network access information, a device manufacturer, a type, a model name, and a supported language of the first device 210.

The wireless device 200 stores the device information of the first device 210 collected in steps 303 and 305 and constructs the device management standard object (Stdobj) in step 307 based on the DM protocol using the corresponding device information.

The device management standard object includes a tree structure, which defines basic information of a device, such as network access information, a manufacturer, a model name, and a supported language of the device. For example, the device management standard object may be based on the OMA DM standard.

The device management standard object may include the parameter of the object having the tree structure corresponding to the detail information of the device, such as various firmware, software, parameters, schedules, and H/W capabilities presently installed in the device. The wireless device 200 can make the device management object included in the first device 210 correspond to the device management object that is compatible with the DM server 230, or extract the device information of the first device 210 and construct a new device management standard object. That is, if the wireless device 200 includes the device information of the first device 210 matching with each of the parameters of the device management standard object, the wireless device 200 inputs the device information of the first device 210 into a value of a corresponding parameter. However, if the wireless device 200 does not include the device information of the first device 210 matching with each of the parameters of the device management standard object, the wireless device 200 can indicate a value of a corresponding parameter as a blank. In other words, if there is no specific device information corresponding to a specific parameter among parameters having tree structure for indicating the device management standard object, the wireless device 200 does not store any value in a place where the value of the specific parameter is stored in the tree structure.

The wireless device 200 stores the device management standard object of the first device 210 that has been constructed according to a conversion or substitution process.

The device management standard object transferred to the management server 230 may include the basic information of the first device 210 according to the embodiment of the present invention or only identification information of the first device 210. If the device management standard object includes only the identification information, the management server 230 receives only a list of the devices that are managed by the wireless device 200.

The device management standard object of the device subject to the management by the wireless device 200, such as the first device 210, can be constructed as shown in FIGS. 5A through 5D.

Figure 5A:
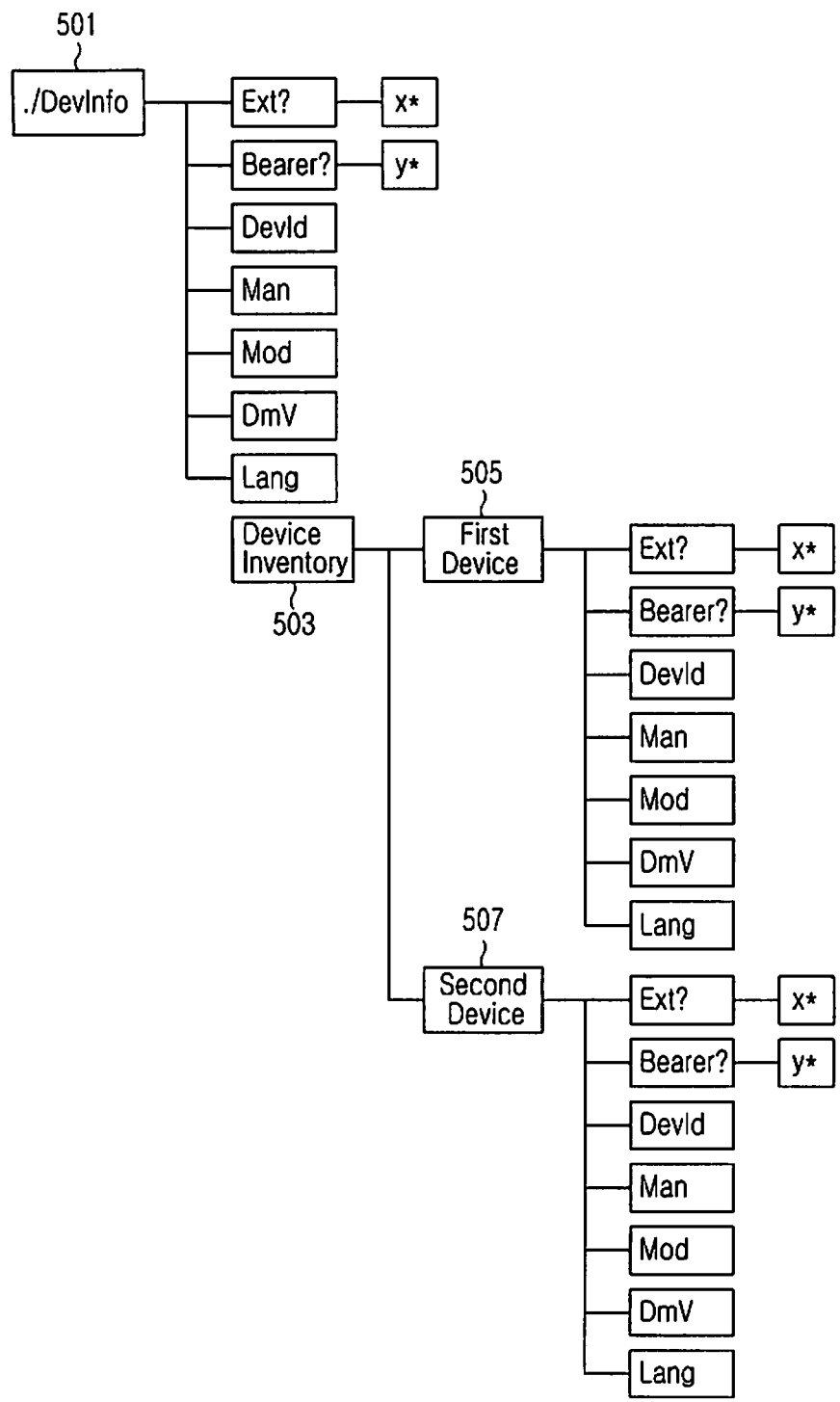
FIGS. 5A and 5B illustrate examples of a management standard object according to a first embodiment of the present invention.

The device management standard object of the first device 210 is subordinated to the device management standard object of the wireless device 200, so that it is constructed as one item of the device list of the personal area network managed by the wireless device 200 as shown in FIG. 5A. Alternatively, the device management standard object can be constructed in parallel with the wireless device 200 as shown in FIG. 5B.

FIG. 5A illustrates a tree structure of the device management standard object when a device information object 505 of the first device 210 and a device information object 507 of the second device 220 are included as sub parameters of a device inventory parameter 503 disclosed by the present invention in a Device Information (DevInfo) object 501 of the wireless device 200.

Figure 5B:
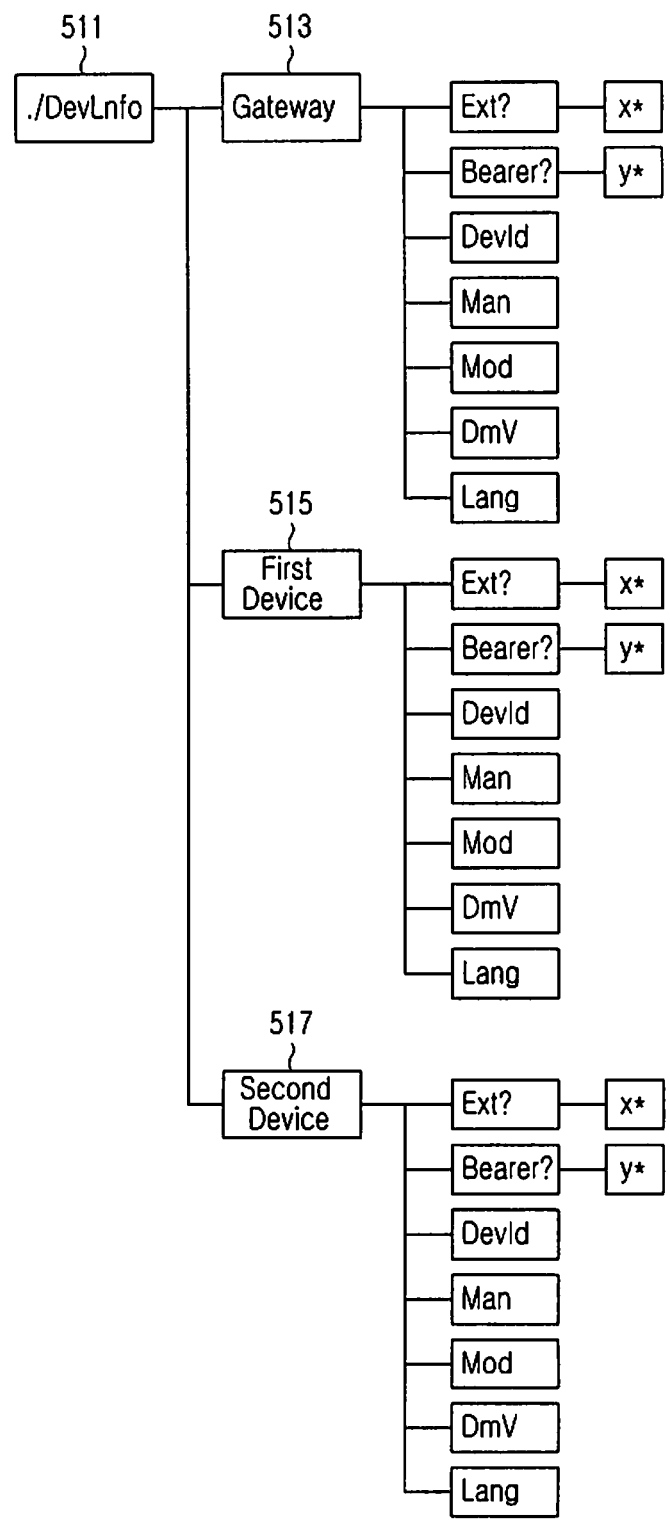

FIG. 5B illustrates a tree structure of the device management standard object when a device information object 515 of the first device 210, a device information object 517 of the second device 220, and a device information object 513 of the wireless device 200 are equally included as sub parameters of a device information object 511.

Figure 5C:
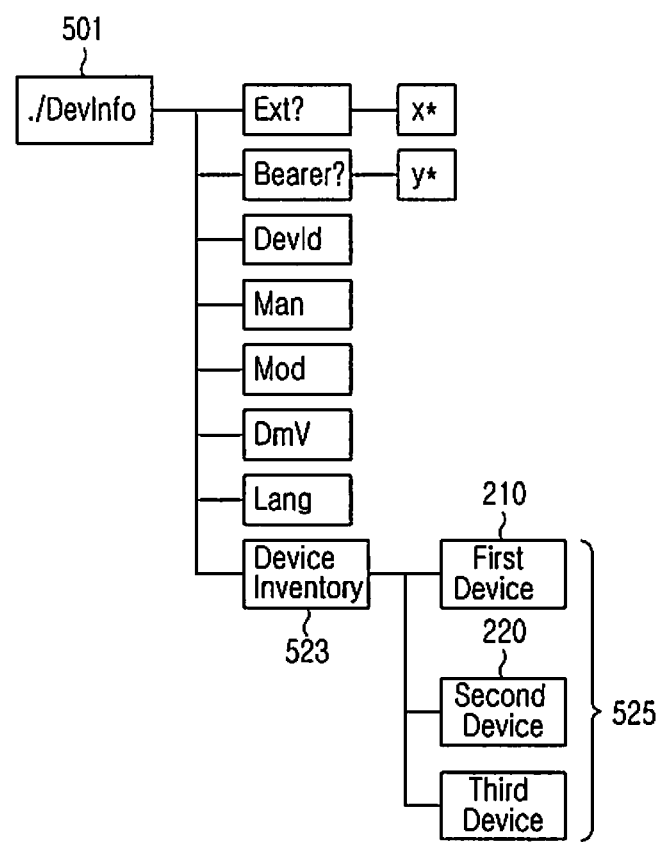
FIGS. 5C and 5D illustrate examples of a management standard object according to a second embodiment of the present invention.
Figure 5D:
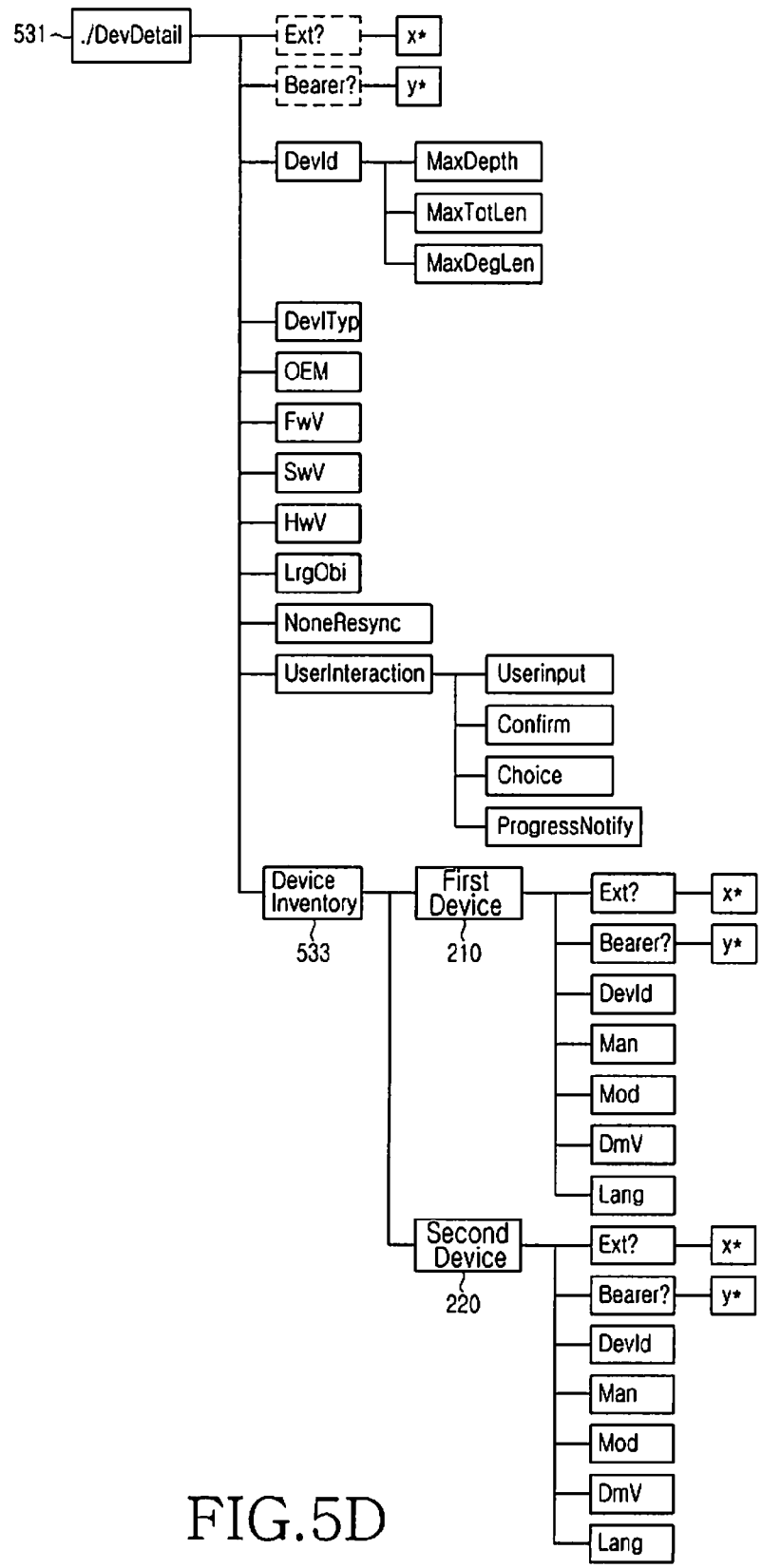

Otherwise, as shown in FIG. 5C, only the identification information of the devices that participate in the personal area network managed by the wireless device 200 are included as sub parameters 525 of a device inventory parameter 523 of a device information object 521, and basic information and detail information of each of the devices in the personal area network can be stored in a device detail information object (./DevDetail) 531 shown in FIG. 5D. It is noted that in FIG. 5D, the device information of the first device 210 and the second device 220 are included as sub parameters of a device inventory parameter 533, which is a sub parameter of the device detail information object 531.

A value of the device inventory parameter 523 may be an address of a storage of the device inventory of the personal area network, in which case the sub parameter storing the device inventory of the personal area network can be omitted.

Generally, the parameter included in the device information object is information transferred from the wireless device 200, i.e. the DM client 222, to the DM server 230 whenever each DM session is established, so that the device information object includes only the necessary parameter that may incur a problem in an operation of the DM protocol when the parameter is absent. Therefore, as shown in FIG. 5C, only the inventory 525 of the devices 210 and 220 managed by the wireless device 200 serving as the gateway device is included in the device information object 521 and transferred to the DM server 230, so that the DM server 200 recognizes only the existence of the corresponding devices. Further, the basic information and the detail information of each of the devices 210 and 220 are included in the device detail information object 531 and transferred to the DM server 200 only when requested by the DM server 200, which improves the efficiency of the management standard object.

The tree of the device management standard object shown in FIGS. 5A and 5B includes a Device Information parameter (DevInfo), an Extension parameter (Ext?) indicating a node that has been reserved to be extended for later use, a network parameter (Bearer?) indicating a supported network, a Device ID parameter (DevId), a Manufacturer parameter (Man), a Model name parameter (Mod), a DM client-Version parameter (DmV), and a supported Language parameter (Lang).

The device detail information object 531 shown in FIG. 5D includes an Extension (Ext?) parameter and a network (Bearer?) parameter, and may further include sub parameters including a parameter of a Maximum Depth of the tree (URI/MaxDepth) indicating the maximum number of URI segments supported by the device, a parameter of a URI Maximum Total Length of URI (URI/MaxTotLen) indicating the maximum length of the entire URI, and a parameter of a URI Segment Length (URI/MaxSegLen) indicating the maximum length of each URI segment.

According to the device information of each device to be included in the detail information object 531, the detail information object 531 includes sub parameters including a Device Type (DevTyp) parameter indicating a type of device, such as a PDA or a cellular phone, an Original Equipment Manufacturer (OEM) parameter indicating a device manufacturer, a Firmware Version (FwV) parameter indicating a version of firmware installed in the device, a Software Version (SwV) parameter indicating a version of software installed in the device, a Hardware Version (HwV) parameter indicating a version of hardware installed in the device, and an OMA DM Large Object Handling Specification (LrgObj) parameter indicating whether a device supports the DM service.

Further included in the detail information object 531 are a temporal Resynchronization (NonceResync) parameter storing a temporal value for the purpose of resynchronization and security, a User Input (UserInteraction/User Input) parameter storing an input of a user, a User Input Confirmation (UserInteraction/Confirm) parameter indicating the confirmation of the input of the user, a User Choice (UserInteraction/Choice) parameter indicating a choice input from a user, and a User Progress state Notification (UserInteraction/ProgressNotify) parameter indicating a progress state notification input from a user.

The selection or requirement of the user related to the device management can be stored in the user parameters, such as the user input parameter, the user input confirmation parameter, the user choice parameter, and the user progress state notification parameter. For example, a request for specific software update of a device, whether to agree or disagree to the update or the update time, can be determined by the user and stored in the user parameters. Such a request from the user can be similarly made with respect to other functions of the device, in addition to software.

Therefore, in constructing the standard management object, the wireless device 200 can provide a user interface through which the user can determine whether to agree to the management by the DM server 200 with respect to the function or the element of the device of the first device 210 and the second device 220 subject to the management, the specific management process, or the like.

Returning to FIG. 3, when the construction of the device management standard object using the device information of the first device 210 has been completed, the wireless device 200 establishes the DM session with the DM server using the DM client 222 installed in the wireless device 200 in step 309, and the DM session establishment is implemented according to the transmission of the DM session establishment request package #1 message to the DM server 230 as noted in the conventional art.

The DM session establishment request package #1 message should include at least minimum information necessary for the device management among the collected device information of the devices that are subject to the proxy management of the wireless device 200 according to the present invention.

Therefore, the device management standard object similarly constructed with FIG. 5A or 5B can be included in the DM session establishment request package #1 message. That is, the basic information of the devices 210 and 220 that are proxy-managed by the wireless device 200 is included in the device management standard object as the minimum information, so that it is transferred to the DM server 230.

Alternatively, the device management standard object similarly constructed with FIG. 5C can be included in the DM session establishment request package #1 message. That is, the inventory including the identification information of the devices 210 and 220 that are proxy-managed by the wireless device 200 is transferred to the DM server 230 as the minimum information. In this case, although not shown in FIG. 3, the DM server 230 makes a request to the wireless device 200 for the detail information of the devices 210 and 220 subject to the management. In response to the request, the wireless device 200 transfers the device management standard object having a similar structure to FIG. 5D to the DM server 230, in order to provide the DM server 230 with the detail information of the devices 210 and 220 subject to the management.

Further, according to the present invention, the DM session establishment request package #1 message can include the device information of the first device 210 that is proxy-managed by the wireless device 200 and credentials of the first device 210 that can be authenticated by the DM server 230, as well as the device information of the wireless device 200 and credentials of the wireless device 200 that can be authenticated by the DM server 230. The DM session establishment request package #1 message can also include device management function list information supported by the first device 210 among the device management functions based on the DM protocol provided from the DM server 230. For example, the device management function is a firmware update, software update, parameter modification, schedule management, or device performance control. The following description will be given with an example in which the device management function supported by the first device 210 is the software update function.

Further to the DM session establishment request package #1 message, the wireless device 200 has made a request for the DM session establishment in place of the first device 210 and the credentials of the first device 210 are identical to the credentials of the wireless device 200 or are determined in advance with the DM server 230.

When the DM server 230 has received the DM session establishment request package #1 message, the DM server 230 confirms the message as the device management request of the first device 210 and searches for a management function to be updated among the DM management functions supported by the first device 210. In the embodiment of FIG. 3, the DM management function supported by the first device 210 is the software update function, so that the DM server 230 searches for the software to be updated by the first device 210.

If the management function to be updated or modified in relation to the first device 210 has been found, the DM server 230 constructs function management data and notifies the wireless device 200 of the function management data through the package #2 message. The software to be updated corresponds to the function management data. In this respect, the DM server 230 notifies the wireless device 200 of the existence of the software (S/W) to be updated included in the first device 210 using the package #2 message in step 311. When the wireless device 200 accepts the update of the software through the package #3 message in step 313, the DM server 230 includes updated software of the corresponding software in the package #4 message and transfers the package #4 message to the wireless device 200, in order to replace the existing software. That is, the wireless device 200 transfers the updated software received from the DM server 230 to the first device 210 through the personal area network and the first device 210 stores the received updated software.

At this time, the acceptance of the software update may be made automatically, determined according to the selection matter preset by the user, or determined according to the user's present selection. When the software update may be accepted according to the user's selection, a menu screen allowing the user to determine the acceptance of the software update can be displayed on the wireless device 200.

Otherwise, the DM server 230 includes an address from which the corresponding updated software can be downloaded in the package #4 message and transfers the package #4 message to the wireless device 200 in step 315. If the software to be updated is related to the contents provided from the service providing server 240, the address may be of the service providing server 240.

Therefore, in order to receive a predetermined service for the software update, the wireless device 200 connects a predetermined service session with the service providing server 240 in step 317, and transfers an indicator by which the service providing server 240 can recognize that the first device 210 has connected the device management session with the DM server 230 through the wireless device 200 and the device information of the first device 210 to the service providing server 240. The transferred device information may be extracted from the information of the first device 210 that has been received in step 305 or the minimum identification information, such as a type or a model name of the first device 210.

When the session has been established, the wireless device 200 makes a request for the update of the necessary software to the service providing server 240 using the address received, in step 319. The service providing server 240 transmits the updated software of the corresponding software to the wireless device 200 in step 321. The wireless device 200 transmits the received updated software to the first device 210 through the personal area network in step 323, so that the first device 210 can install the corresponding software. The download of the software from the service providing server 240 can also be performed automatically or determined according to the selection of the user.

When the wireless device 200 has downloaded the updated software through the package #4 message in step 315 and the first device 210 has replaced the existing software with the updated software, the wireless device 200 transmits only a report notifying the completion of the update of the corresponding software to the service providing server 240 and steps 319 and 321 can be omitted.

As described above, the present invention enables the first device 210 to install the up-to-date version software or the software necessary for using the contents of the service providing server 240, so that the first device 210 can reproduce the contents provided from the service providing server 240. The transfer of the contents from the service providing server 240 to the first device 210 can be performed through the wireless device 200.

FIG. 4 illustrates a device management process according to a second embodiment of the present invention, in which the service providing server 240 triggers the establishment of the DM session and provides the first device 210 with a service.

Steps 401 to 407 of FIG. 4 will not be discussed, as they are identical to steps 301 to 307 of FIG. 3. The wireless device 200 storing the device information of the first device 210 in step 407 establishes a service session with the service providing server 240 in step 409. The wireless device 200 can include the device information of the first device 210 in the service session establishment request message. The transferred device information may be extracted from the information of the first device 210 that has been received in step 405 or the minimum identification information, such as the type and the model name of the first device 210.

In order to assign the device management of the first device 210 to the DM server 230, the service providing server 240 includes an address of the wireless device 200 in the session establishment request message and transmits the session establishment request message to the DM server 230 in step 411. The DM server 230 transmits a DM package #0 message that is a notification message for establishing the DM session with the corresponding wireless device 200 according to the DM session establishment request to the wireless device 200 in step 413.

Then, the wireless device 200 performs steps 415 to 427 in a similar manner to steps 309 to 323 of FIG. 3.

As described above, according to the present invention, the wireless device including the DM client converts the device information of a personal device into the device management standard object based on the DM protocol supported by the DM server 230 to provide the DM server 230 with the converted device management standard object, and receives and transfers the data to be updated to the personal device, in order to remotely manage the device of the system that does not support the DM protocol. The device information of the personal device may be included in the conventional DM message, and the DM message includes remote management function list information supported by the personal device, so that the present invention can more efficiently manage the device.

According to the present invention, even if the device having no access function to the external network or having no DM client can access the personal area network, the device can manage various firmware, software, parameters, schedules, and H/W capabilities of the device through linking with the DM server of the external network via the device functioning as the gateway. The device can receive the service provided from the service server of the external network and provide the user with the received service.

While the present invention has been shown and described with reference to certain embodiments and drawings, it will be understood by those skilled in the art that various changes in form and details may be made therein without departing from the spirit and scope of the invention. For example, the service providing server 240 and the DM server 230 are logical entities, respectively, and may reside together in a single physical server. Further, the software update has been described herein by way of example, but the management and update of another function of the device can be performed in a similar manner. Further, the wireless device 200 has been described herein as an example of the management device functioning as the gateway, but the wired device may be used for the management device. Therefore, the scope of the present invention is not limited to the described embodiments, but should be defined by the appended claims and their equivalents.

What is claimed is:

1. A method for remotely managing at least one device by a management device supporting a device management service provided from a device management server through an external network, the method comprising:
   receiving, by the management device, device information of the at least one device from the at least one device through a personal area network;
   converting, by the management device, information for identifying the at least one device among the received device information from a form unsupported by a device management protocol of the device management server to converted device information of a form based on the device management protocol supported by the device management server;
   transferring, by the management device, the converted device information and device management function list information to the device management server through the external network;
   receiving, by the management device, function management data related to a first device among the at least one device from the device management server though the external network;
   transferring, by the management device, the received function management data to the first device through the personal area network,
   receiving, from the device management server, an address from which function management data related to the first device can be downloaded; and
   establishing a session with a service providing server based on the address and receiving the function management data from the service providing server;
   wherein the device management function list information comprises a list of device management functions supported by the at least one device among multiple device management functions based on the device management protocol,
   wherein the function management data is generated by the device management server based on the device management function list information and comprises information required to perform at least one device management function of the device management function list information, and
   wherein, in establishing the session with the service providing server, the management device transmits an indicator indicating that the management device performs the device management for the at least one device.

2. The method as claimed in claim 1, wherein the information for identifying the at least one device corresponds to basic information of the at least one device, and the basic information is converted into a device management standard object based on the device management protocol.

3. The method as claimed in claim 2, wherein the management device transfers, to the device management server, credentials representing that the device management server is able to authenticate the management device together with the device management standard object.

4. The method as claimed in claim 1, wherein the information for identifying the at least one device includes identification information of the at least one device, and at least one of the converted device information and the device management function list information is transmitted to the device management server in response to a request of the device management server.

5. The method as claimed in claim 1, further comprising:
   transferring, after converting the information for identifying the at least one device into the converted device information in the form based on the device management protocol supported by the device management server, identification information of the at least one device to a server providing a predetermined service;
   receiving, in response to a request for the device management for the at least one device to the device management server by the server, a device management notification message for the at least one device from the device management server; and transferring, after receiving the device management notification message, the converted device information to the device management server.

6. The method as claimed in claim 1, wherein the at least one device supports different types of device management services.

7. The method as claimed in claim 1, wherein the at least one device does not support the device management service.

8. The method as claimed in claim 1, wherein the device information of the at least one device further comprises basic information including at least one of network access information, a manufacturer, a model name, and a supported language of a corresponding device, and detail information including at least one of information on firmware, software, parameters, schedules, and hardware capabilities of a corresponding device.

9. The method as claimed in claim 8, wherein the basic information is defined as device management standard object including a tree which defines the basic information of the corresponding device.

10. A remote management apparatus of a management device, comprising:
  a transmitter/receiver configured to establish a personal area network with at least one device and transmitting and receiving data; and
  a device management client configured to receive device information of the at least one device from the at least one device through the personal area network, to convert information for identifying the at least one device among the received device information from a form unsupported by a device management protocol of the device management server to converted device information of a form based on the device management protocol supported by a device management server, to transfer the converted device information and device management function list information to the device management server through the transmitter/receiver through an external network, to receive function management data related to a first device among the at least one device from the device management server through the transmitter/receiver through the external network, and to transfer the received function management data to the first device through the transmitter/receiver through the personal area network,
  wherein the device management function list information comprises a list of device management functions supported by the at least one device among multiple device management functions based on the device management protocol,
  wherein the function management data is generated by the device management server based on the device management function list information and comprises information required to perform at least one device management function of the device management function list information,
  wherein the device management client is configured to receive an address from which function management data related to the first device can be downloaded from a service providing server through the transmitter/receiver, to establish a session with the service providing server based on the address through the transmitter/receiver, and to receive the function management data from the service providing server, and
  wherein, in establishing the session with the service providing server, the management device transmits an indicator indicating that the management device performs the device management for the at least one device.

11. The remote management apparatus as claimed in claim 10, wherein the information for identifying the at least one device includes basic information of the at least one device, and the basic information is converted into a device management standard object based on the device management protocol.

12. The remote management apparatus as claimed in claim 11, wherein the device management client is configured to transfer, to the device management server, credentials representing that the device management server is able to authenticate the management device together with the device management standard object through the transmitter/receiver.

13. The remote management apparatus as claimed in claim 10, wherein the information for identifying the at least one device includes identification information of the at least one device, and
  wherein at least one of the converted device information and the device management function list information is transmitted to the device management server through the transmitter/receiver in response to a request of the device management server.

14. The remote management apparatus as claimed in claim 10, wherein after converting the information for identifying the at least one device into the converted device information of a form based on a device management protocol supported by the device management server, the device management client is configured to transfer identification information of the at least one device to a server providing a predetermined service through the transmitter/receiver, to receive a device management notification message for the at least one device from the device management server through the transmitter/receiver in response to a request for the device management for the at least one device to the device management server by the another server, and to transfer the converted device information to the device management server through the transmitter/receiver after receiving the device management notification message.

15. The remote management apparatus as claimed in claim 10, wherein the at least one device supports different types of device management services.

16. The remote management apparatus as claimed in claim 10, wherein the at least one device does not support the device management service.

17. The remote management apparatus as claimed in claim 10, wherein the device information of the at least one device further comprises basic information including at least one of network access information, a manufacturer, a model name, and a supported language of a corresponding device, and detail information including at least one of information on firmware, software, parameters, schedules, and hardware capabilities of a corresponding device.

18. The remote management apparatus as claimed in claim 17, wherein the basic information is defined as the device management standard including a tree which defines the basic information of a corresponding device.

* * * * *